United States Patent
Shimizu et al.

(10) Patent No.: US 9,239,641 B2
(45) Date of Patent: *Jan. 19, 2016

(54) ELECTRONIC UNDERLAY

(71) Applicant: NITTO DENKO CORPORATION, Ibaraki-shi, Osaka (JP)

(72) Inventors: Yusuke Shimizu, Ibaraki (JP); Ryoma Yoshioka, Ibaraki (JP)

(73) Assignee: NITTO DENKO CORPORATION, Ibaraki-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/362,060

(22) PCT Filed: Jan. 21, 2014

(86) PCT No.: PCT/JP2014/051026
§ 371 (c)(1),
(2) Date: May 30, 2014

(87) PCT Pub. No.: WO2014/136481
PCT Pub. Date: Sep. 12, 2014

(65) Prior Publication Data
US 2015/0241991 A1 Aug. 27, 2015

(30) Foreign Application Priority Data

Mar. 8, 2013 (JP) ................................. 2013-046608
Apr. 19, 2013 (JP) ................................. 2013-087943

(51) Int. Cl.
*G06F 3/042* (2006.01)
*G06F 3/038* (2013.01)
(Continued)

(52) U.S. Cl.
CPC .............. *G06F 3/038* (2013.01); *G02B 6/122* (2013.01); *G02B 26/0875* (2013.01); *G06F 3/03545* (2013.01); *G06F 3/0421* (2013.01); *G06F 3/0428* (2013.01)

(58) Field of Classification Search
CPC . G06F 3/0481; G06F 3/0421; G06F 3/04883; G06F 3/042; G06F 1/1643; G06F 2203/04109; G06F 2203/04808; G06F 2203/04809; G06F 3/016; G06F 3/0325; G06F 3/0428
See application file for complete search history.

(56) References Cited

U.S. PATENT DOCUMENTS 6,396,598 B1   5/2002   Kashiwagi et al.
2004/0164972 A1   8/2004   Carl
(Continued)

FOREIGN PATENT DOCUMENTS

CN   1614534 A   5/2005
CN   1734470 A   2/2006
(Continued)

OTHER PUBLICATIONS

U.S. Office Action dated Dec. 9, 2014, issued in corresponding U.S. Appl. No. 14/361,996 (16 pages).
(Continued)

*Primary Examiner* — Michael Faragalla
*Assistant Examiner* — Scott Au
(74) *Attorney, Agent, or Firm* — Westerman, Hattori, Daniels & Adrian, LLP

(57) ABSTRACT

Provided is an electronic underlay designed not to sense a hand holding a writing tool at the time of writing notes on a sheet. The electronic underlay is provided with: a sheet-like optical waveguide formed by sandwiching lattice-like cores between a sheet-like under cladding and over cladding layers; a light emitting element connected to one end surface of the core; a light receiving element connected to another end surface of the core; and storage means for storing an inputted note as electronic data. An elasticity modulus of the core is larger than that of the under cladding layer and the over cladding layer. When the surface of the optical waveguide is pressed, in the pressing direction, a deformation ratio of the core in a cross section is smaller than that of the over cladding layer and the under cladding layer.

4 Claims, 2 Drawing Sheets

(51) Int. Cl.
  *G02B 26/08* (2006.01)
  *G02B 6/122* (2006.01)
  *G06F 3/0354* (2013.01)

(56) References Cited

U.S. PATENT DOCUMENTS

| | | |
|---|---|---|
| 2008/0019616 A1 | 1/2008 | Hotta et al. |
| 2010/0156848 A1 | 6/2010 | Yatsuda et al. |
| 2010/0171717 A1 | 7/2010 | Hu et al. |
| 2011/0079501 A1 | 4/2011 | Arai |
| 2012/0327033 A1 | 12/2012 | Shimizu et al. |
| 2013/0009911 A1 | 1/2013 | Shibata et al. |
| 2013/0015334 A1 | 1/2013 | Chen et al. |

FOREIGN PATENT DOCUMENTS

| | | |
|---|---|---|
| CN | 1752994 A | 3/2006 |
| CN | 1774690 A | 5/2006 |
| CN | 1855010 A | 11/2006 |
| CN | 102034765 A | 4/2011 |
| CN | 102411433 A | 4/2012 |
| CN | 102411458 A | 4/2012 |
| CN | 102722284 A | 10/2012 |
| CN | 102812503 A | 12/2012 |
| CN | 102831391 A | 12/2012 |
| CN | 102890565 A | 1/2013 |
| JP | 61-188515 A | 8/1986 |
| JP | 01-172916 A | 7/1989 |
| JP | 02-115919 A | 4/1990 |
| JP | 10-91348 A | 4/1998 |
| JP | 2002-344641 A | 11/2002 |
| JP | 2005-107804 A | 4/2005 |
| JP | 3746378 B2 | 2/2006 |
| JP | 2006-301979 A | 11/2006 |
| JP | 2007-34907 A | 2/2007 |
| JP | 2010-151992 A | 7/2010 |
| JP | 2012-198301 A | 10/2012 |
| JP | 2013-8138 A | 1/2013 |
| WO | 2014/136471 A1 | 9/2014 |
| WO | 2014/136472 A1 | 9/2014 |
| WO | 2014/136508 A1 | 9/2014 |

OTHER PUBLICATIONS

International Search Report dated Mar. 4, 2014, issued in Application No. PCT/JP2014/051028. (5 pages).
International Search Report, dated Mar. 4, 2014, issued in Application No. PCT/JP2014/051027. (5 pages).
English Translation of Written Opinion dated Mar. 4, 2014, issued in Application No. PCT/JP2014/051027 (4 pages).
English Translation of Written Opinion dated Mar. 4, 2014, issued in Application No. PCT/JP2014/051028 (4 pages).
Search Report dated Feb. 25, 2015, issued in corresponding Chinese Patent Application No. 201480000284.2, with English translation (4 pages).
International Search Report dated Mar. 4, 2014, issued in corresponding application No. PCT/JP2014/51026.
Translation of Written Opinion dated Mar. 4, 2014, issued in corresponding Application No. PCT/JP2014/051026 (4 pages).
Chinese Search Report dated Jun. 25, 2015, issued in counterpart application No. 201480000283.8 (w/English translation) (4 pages).
Notification of Transmittal of Translation of International Preliminary Report on Patentability (Form PCT/IB/338) issued in counterpart International Application No. PCT/JP2014/051027 dated Sep. 17, 2015, with Forms PCT/ISA/237 and PCT/IB/373 (6 pages).
Supplementary European Search Report dated Oct. 27, 2015, issued in European Patent Application No. 1427698.4 (10 pages).
Supplementary European Search Report dated Oct. 27, 2015, issued in European Patent Application No. 14727699.2 (8 pages).
Supplementary European Search Report dated Oct. 27, 2015, issued in European Patent Application No. 14727700.8 (9 pages).
Wouters, et al., "Determining the Young's modulus and creep effects in three different photo definable epoxies for MEMS applications", Sensors and Actuators A: Physical, 2009, pp. 196-200.
Notification of Transmittal of Translation of the International Preliminary Report on Patentability (Form PCT/IB/338) issued in counterpart International Application No. PCT/JP2014/051026 mailed Sep. 17, 2015, with Forms PCT/IB/373 and PCT/ISA/237 (7 pages).
Notification of Transmittal of Translation of the International Preliminary Report on Patentability (Form PCT/IB/338) issued in counterpart International Application No. PCT/JP2014/051028 mailed Sep. 17, 2015, with Forms PCT/IB/373 and PCT/ISA/237 (6 pages).

ELECTRONIC UNDERLAY

TECHNICAL FIELD

The present invention relates to an electronic underlay, which can be laid under a sheet where notes or the like are to be written, to store (record) the notes or the like written on the sheet as electronic data.

BACKGROUND ART

For example, there exists one, such as an electronic notebook, which performs digital processing on notes, a schedule, and the like (e.g., see PL 1.). This is provided with a display for displaying a schedule or the like, to allow notes or the like to be inputted on the display by use of a dedicated pen or the like. That is, the display is one (touch panel) with a touch sensor, and by bringing a tip of the dedicated pen into contact with the display and moving the dedicated pen, a movement locus of the tip of the dedicated pen is inputted as notes or the like on the display. Then, in a state where the inputted information such as the notes overlaps with information such as the schedule displayed on the display, the data is stored (recorded) in the electronic notebook.

CITATION LIST

Patent Literature

PL1: Japanese Patent No. 3746378

SUMMARY OF THE INVENTION

However, there has also been a demand for inputting information not into the electronic notebook but into a type of a notebook in which writing is performed on a sheet with a writing tool such as a pen.

The present applicant has proposed and already filed an application of the invention which related to a notebook device in which notes or the like can be written on a sheet, and the notes or the like can also be digitized and stored (Japanese Patent Application Laid-Open No. 2012-160160). The notebook device is provided with an optical waveguide in a square frame shape, and allows light to travel in a lattice shape within the square frame. When the optical waveguide in the square frame shape is put on a bound sheet in which writing is to be performed with a writing tool and notes or the like are written with the writing tool in a portion of the sheet exposed from the inside of the square frame, a pen tip shades the light traveling in the lattice shape and a position of the pen tip is detected from the light shaded position, thereby to allow the written note or the like to be specified. Further, the notebook device is provided with storage means, to store the specified note or the like as electronic data. That is, the notebook device is to allow the notes or the like written on the sheet to be left on the sheet, and also allow it to be stored (recorded) as electronic data into the storage means.

However, in the notebook device, it happens in some cases that, when a little finger, its root portion (hypothenar) or the like of a hand holding the writing tool such as the pen comes into the square frame, that portion of the hand also shades the lattice-like light and may thus be judged as a written note or the like and stored (recorded) into the storage means. The stored (recorded) data of the portion of the hand is unnecessary.

The present invention was made in view of such circumstances, and has an object to provide an electronic underlay, which is not one using light-shading as described above, but one using a change in light propagation of a core based on writing pressure that is applied to an optical waveguide by a writing tool such as a pen. For this reason, the electronic underlay is not one used by being put on a sheet as described above, but one used by being laid under the sheet, and designed not to sense an unnecessary portion such as a little finger, its root portion or the like of a hand holding a writing tool such as a pen at the time of writing notes or the like on the sheet with the writing tool.

In order to achieve the above object, an electronic underlay according to the present invention is an electronic underlay which is used by being laid under a sheet to perform writing on with a writing tool. The electronic underlay comprises: a sheet-like optical waveguide in which a plurality of linear cores are arranged and formed in a lattice shape on the surface of a sheet-like under cladding layer, an over cladding layer is formed in a sheet shape in the state of covering these cores, and the surface of the over cladding layer is made a contact surface with the sheet; a light emitting element connected to one end surface of the core; a light receiving element connected to the other end surface of the core; movement locus specifying means for specifying a movement locus of a tip of a writing tool on the surface of the sheet by use of a light propagation amount of the cores which has been changed due to the movement; and storage means for storing the specified movement locus as electronic data. An elasticity modulus of the core is larger than an elasticity modulus of the under cladding layer and an elasticity modulus of the over cladding layer, and in a state where the surface of the sheet is pressed by the tip of the writing tool, in a direction of the pressing, a deformation ratio of the core in a cross section is smaller than deformation ratios of the over cladding layer and the under cladding layer in cross sections.

It is to be noted that in the present invention, the "deformation ratio" refers to a ratio of an amount of change in a pressing direction in each of thicknesses of the core, the over cladding layer and the under cladding layer at the time of pressing with respect to each of those before pressing. Further, "movement" of the tip of the writing tool includes the case of a movement distance being 0 (zero), and a "movement locus" in that case is a point.

The electronic underlay according to the present invention comprises a sheet-like optical waveguide in which an elasticity modulus of a core is larger than an elasticity modulus of an under cladding layer and an elasticity modulus of an over cladding layer. Accordingly, when the surface of the over cladding layer in the optical waveguide is pressed, in a direction of the pressing, a deformation ratio of the core in a cross section is smaller than deformation ratios of cross sections of the over cladding layer and the under cladding layer in a cross section, and a cross sectional area of the core is retained in the pressing direction. When a sheet is put on the surface of the over cladding layer in the optical waveguide and notes or the like are written on the sheet with a writing tool such as a pen, writing pressure by its tip (pen tip, or the like) and pressure by a portion of a hand holding the writing tool are transmitted to the over cladding layer via the sheet, and the surface of the over cladding layer is pressed. The pressing makes it possible that, at a portion pressed by the tip of the writing tool, bending of the core becomes steep along with the tip of the writing tool, and leakage (scattering) of light from the core occurs, and at a portion pressed by the portion of the hand holding the writing tool, bending of the core becomes gentle along the hand, and the leakage (scattering) of light does not occur. This then makes it possible that, as for the core pressed by the tip such as the pen tip, a light detection level (amount of received light) in a light receiving element decreases, and as for the core pressed by the portion of the hand holding the writing tool, a detection level does not decrease. A position (coordinates) of the tip such as the pen tip can be detected by the movement locus specifying means due to the decrease in the light detection level. The portion of the hand whose detection level does not decrease is in the same state as a state where it is not pressed, and it can thus be prevented from being sensed. Therefore, only a movement locus of the tip such as the pen tip (information such as the notes having been written) can be detected and stored into the storage means. That is, the information such as the notes having been written on the sheet can be left on the sheet, and can also be stored (recorded) as electronic data into the storage means.

BRIEF DESCRIPTION OF THE DRAWINGS

FIG. 1 schematically shows one embodiment of an electronic underlay of the present invention, where

DESCRIPTION OF EMBODIMENTS

Next, an embodiment of the present invention will be described in detail based on the drawings.

Figure 1A:
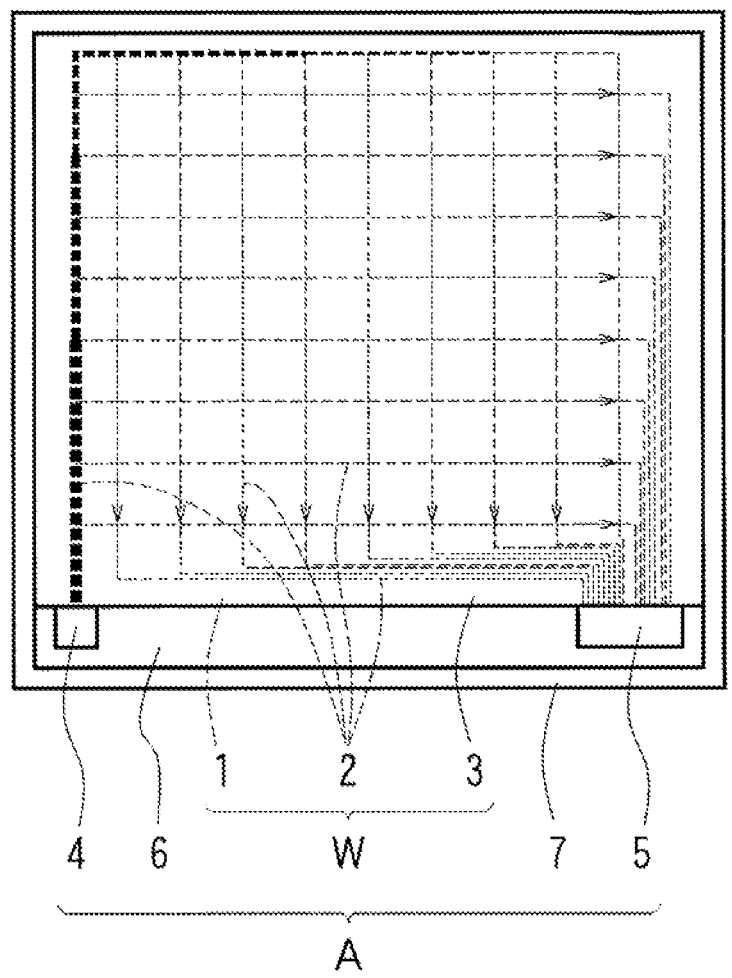
FIG. 1A is its plan view and FIG. 1B is its enlarged sectional view.
Figure 1B:
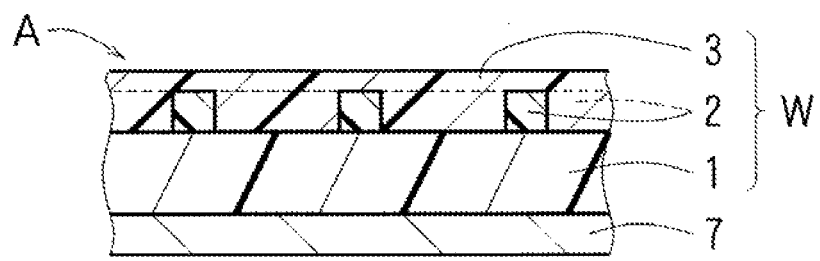

FIG. 1A is a plan view showing one embodiment of an electronic underlay of the present invention, and FIG. 1B is an enlarged view of a cross section of its center. An electronic underlay A of this embodiment is provided with: a square sheet-like optical waveguide W formed by sandwiching lattice-like cores 2 between a square sheet-like under cladding layer 1 and a square sheet-like over cladding layer 3; a light emitting element 4 connected to one end surface of each of linear cores 2 constituting the lattice-like cores 2; a light receiving element 5 connected to the other end surface of the linear core 2; and a circuit board 6 mounted with the light emitting element 4, the light receiving element 5, storage means (not shown) for storing an inputted note or the like as electronic data, a CPU (central processing unit) (not shown) for controlling the electronic underlay A, and a battery (not shown) for supplying electricity to the light emitting element 4 and the like. In this embodiment, the optical waveguide W and the circuit board 6 are provided on the surface of a rigid plate 7 such as a resin plate or a metal plate. Then, light emitted from the light emitting element 4 passes through the core 2, and is received in the light receiving element 5. Further, in the optical waveguide W, an elasticity modulus of the core 2 is larger than an elasticity modulus of the under cladding layer 1 and an elasticity modulus of the over cladding layer 3. With this elasticity moduli, when the surface of the optical waveguide W is pressed, a deformation ratio of the core 2 in a cross section is made smaller than deformation ratios of the over cladding layer 3 and the under cladding layer 1 in cross sections, in the pressing direction.

It is to be noted that in FIG. 1A, the core 2 is indicated by a chain line, and a thickness of the chain line indicates a thickness of the core 2. Further, in FIG. 1A, the cores 2 are illustrated in abbreviated number. Moreover, an arrow of FIG. 1A indicates a light travelling direction.

Figure 2:
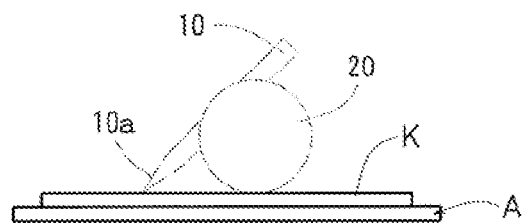
FIG. 2 is a side view schematically showing a service state of the electronic underlay.

As shown in the side view of FIG. 2, the electronic underlay A is used by being laid under a sheet K to write notes or the like on with a writing tool 10. At this time, the surface of the over cladding layer 3 [cf. FIGS. 3A and 3B] in the optical waveguide W of the electronic underlay A is the contact surface for the sheet K. Then, the note or the like is inputted by holding the writing tool 10 with a hand 20 and writing the notes or the like on the surface of the sheet K with the writing tool 10. An input region on the sheet K is a portion corresponding to the lattice-like cores 2 (cf. FIG. 1A) in the optical waveguide W of the electronic underlay A.

Figure 3A:
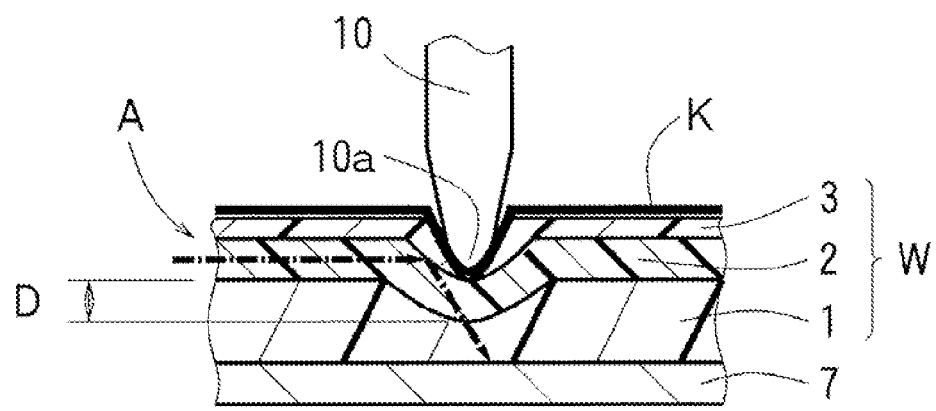
FIG. 3A is a sectional view schematically showing a state of an optical waveguide of the electronic underlay, pressed by a writing tool via a sheet.
Figure 3B:
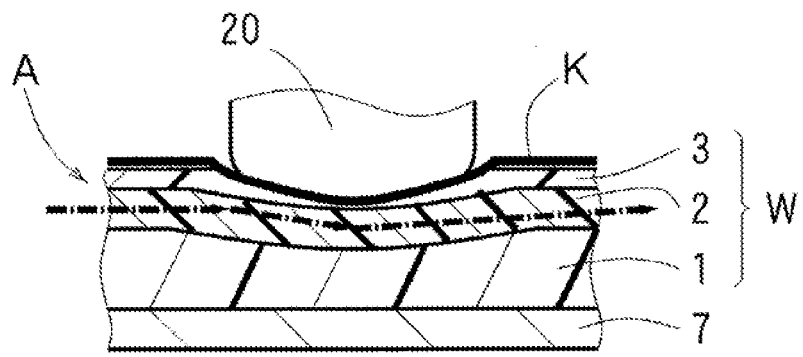
FIG. 3B is a sectional view schematically showing a state of the optical waveguide pressed by a hand via the sheet.

That is, as shown in the sectional views of FIGS. 3A and 3B, when information such as notes is inputted on the surface of the sheet K by writing it with the writing tool 10 such as a pen held in the hand 20 or by some other means, writing pressure by a tip 10a, such as a pen tip, and pressure by a little finger, its root portion (hypothenar) or the like of the hand 20 holding the writing tool 10, are transmitted to the over cladding layer 3 via the sheet K, and the surface of the over cladding layer 3 is pressed. Due to the pressing, on the cross section in the pressing direction, both in a portion pressed by the tip 10a such as the pen tip [cf. FIG. 3A] and a portion pressed by a portion of the hand 20 [cf. FIG. 3B], the over cladding layer 3 and the under cladding layer 1 having the smaller elasticity moduli are deformed so as to be crushed, and the core 2 having the larger elasticity modulus is bent so as to sink into the under cladding layer 1 along the tip 10a such as the pen tip and the portion of the hand 20, while retaining its cross sectional area.

Then, as shown in FIG. 3A, at the portion pressed by the tip 10a such as the pen tip, bending of the core 2 becomes steep since the tip 10a is sharp, and leakage (scattering) of light from the core 2 occurs [cf. two-dot chain line of FIG. 3A]. On the other hand, as shown in FIG. 3B, at the portion pressed by the hand 20 holding the writing tool 10, bending of the core 2 becomes gentle since the hand 20 is quite large and round as compared with the tip 10a of the writing tool 10, and leakage (scattering) of light does not occur (light travels within the core 2 without being leaked [cf. two-dot chain line of FIG. 3B]. This makes it possible that, as for the core pressed by the tip 10a such as the pen tip, a light detection level in the light receiving element 5 decreases, and as for the core 2 pressed by the hand 20 holding the writing tool 10, a detection level does not decrease. Then, due to the decrease in light detection level, a position (coordinates) of the tip 10a such as the pen tip can be detected. The portion of the hand 20 whose detection level does not decrease is in the same state as a state where it is not pressed, and it is thus not sensed.

Thereat, the CPU of the electronic underlay A is incorporated with a program (movement locus specifying means) for specifying a movement locus of the tip 10a such as the pen tip from the decrease in light detection level in the light receiving element 5. That is, the electronic underlay A serves as a positional sensor for detecting the position of the tip (pen tip, etc.) 10a of the writing tool (pen, etc.) 10 that is used for inputting information. Then, data indicating the movement locus of the tip 10a of the writing tool 10 is recorded (stored) as electronic data into the storage means such as the memory.

As thus described, when information such as notes is written on the sheet K by use of the electronic underlay A, the information such as the notes can be left on the sheet K, and can also be stored (recorded) as electronic data into the storage means such as the memory. For this reason, even when the sheet K with the information such as the notes written thereon is lost, the information such as the notes can be reproduced from the storage means, and on the contrary, even when the storage means is damaged, the information such as the notes can be confirmed by use of the sheet K.

Moreover, since the elasticity modulus of the core 2 is larger than the elasticity modulus of the under cladding layer 1 and the elasticity modulus of the over cladding layer 3 in the optical waveguide W, even when the optical waveguide W is pressed by the hand 20 holding the writing tool 10, only the position of the tip 10*a* such as the pen tip can be detected and the portion of the hand 20 can be prevented from being sensed as described above.

Further, at the time of inputting the sheet K, the portion of the optical waveguide W which is pressed by the tip 10*a* of the writing tool 10 via the sheet K is deformed as described above, thereby making writing performance favorable.

Then, information such as notes stored (recorded) in the storage means can be reproduced (displayed) using a reproduction terminal [personal computer (hereinafter referred to as "PC"), smart phone, tablet type terminal, etc.), and can further be stored into the reproduction terminal. In this case, the reproduction terminal is connected with the electronic underlay A through a connection cable such as a micro USB cable. It should be noted that storage (recording) into the memory as the storage means is, for example, performed in a general-purpose file format such as pdf.

In addition, when the pressing by the tip 10*a* of the writing tool 10 is released (when the tip 10*a* moves or input such as writing is completed), the under cladding layer 1, the core 2 and the over cladding layer 3 return to their original states [cf. FIG. 1B] due to their own restoring force. A sinking depth D of the core 2 into the under cladding layer 1 is preferably up to 2000 μm at the maximum. When the sinking depth D exceeds 2000 μm, the under cladding layer 1, the core 2 and the over cladding layer 3 may not return to their original states or cracking may occur in the optical waveguide W.

Here, a more detailed description will be given of the elasticity moduli and the like of the core 2, under cladding layer 1 and over cladding layer 3.

The elasticity modulus of the core 2 is preferably within a range of 1 GPa to 10 GPa, and more preferably within a range of 2 GPa to 5 GPa. When the elasticity modulus of the core 2 falls below 1 GPa, a cross sectional area of the core 2 may not be retained (the core 2 may collapse) caused by pressure of the tip 10*a* such as the pen tip due to the shape of the tip 10*a*, and there is a possibility that the position of the tip 10*a* cannot be properly detected. On the other hand, when the elasticity modulus of the core 2 exceeds 10 GPa, bending of the core 2 by pressure of the tip 10*a* may not become steep along the tip 10*a*, but may become gentle. For this reason, leakage (scattering) of light from the core 2 does not occur, causing the light detection level in the light receiving element 5 not to decrease, and hence there is a possibility that the position of the tip 10*a* cannot be properly detected. It is to be noted that a size of the core 2 is, for example, set to a thickness within a range of 5 to 100 μm and a width within a range of 5 to 500 μm.

The elasticity modulus of the over cladding layer 3 is preferably within a range of not lower than 0.1 MPa and lower than 10 GPa, and more preferably within a range of not lower than 1 MPa and lower than 5 GPa. When the elasticity modulus of the over cladding layer 3 falls below 0.1 MPa, the over cladding layer 3 is extremely soft and may thus be damaged by pressure of the tip 10*a* such as the pen tip due to the shape of the tip 10*a*, and the over cladding layer 3 is unable to protect the core 2. On the other hand, when the elasticity modulus of the over cladding layer 3 is not lower than 10 GPa, the over cladding layer 3 is not deformed as it collapses even by pressure of the tip 10*a* and the hand 20, causing the core 2 collapse, and hence there is a possibility that the position of the tip 10*a* cannot be properly detected. It should be noted that a thickness of the over cladding layer 3 is, for example, within a range of 1 to 200 μm.

The elasticity modulus of the under cladding layer 1 is preferably within a range of 0.1 MPa to 1 GPa, and more preferably within a range of 1 MPa to 100 MPa. When the elasticity modulus of the under cladding layer 1 falls below 0.1 MPa, the under cladding layer 1 is extremely soft and may thus not return to its original state after being pressed with the tip 10*a* such as the pen tip, and there is a possibility that the operation cannot be successively performed. On the other hand, when the elasticity modulus of the under cladding layer 1 exceeds 1 GPa, the under cladding layer 1 is not deformed as it collapses even by pressure of the tip 10*a* and the hand 20, causing the core 2 collapse, and hence there is a possibility that the position of the tip 10*a* cannot be properly detected. It should be noted that a thickness of the under cladding layer 1 is, for example, within a range of 20 to 2000 μm.

Examples of formation materials for the core 2, the under cladding layer 1 and the over cladding layer 3 include a photosensitive resin and a thermosetting resin, and the optical waveguide W can be produced by a manufacturing method in accordance with the formation materials. Further, a refractive index of the core 2 is larger than refractive indexes of the under cladding layer 1 and the over cladding layer 3. Each of the elasticity moduli and the refractive indexes can be adjusted, for example, by adjusting selection of the kind or a composition ratio of each formation material. It is to be noted that a rubber sheet may be used as the under cladding layer 1, and the core 2 may be formed in a lattice shape on the rubber sheet.

Further, an elastic layer such as a rubber layer may be provided on the rear surface of the under cladding layer 1 (between the under cladding layer 1 and the rigid plate 7). In this case, even when the restoring force of the under cladding layer 1, the core 2 and the over cladding layer 3 becomes weak or the under cladding layer 1 and the like are originally made of materials with weak restoring force, the weak restoring force can be supported using restoring force of the elastic layer, and their states can be returned to the original ones after pressure by the tip 10*a* of the writing tool 10 has been released.

Further, in order to use the electronic underlay A in a notebook, binding holes may be formed in an edge part of the electronic underlay A so as to correspond to openable/closable ring-like binding tools that bind a plurality of sheets K in the notebook. Since the optical waveguide W can be thin, the electronic underlay A can also be thin, and can thus be settled within the notebook efficiently.

Further, so that only the position of the tip 10*a* such as the pen tip is detected and the hand 20 holding the writing tool 10 such as the pen is not sensed, what is of importance is an amount of leakage (scattering) of light due to abrupt bending of the core 2 at a portion pressed by the tip 10*a*. Then, for example, when a refractive index difference Δ between the core 2 and the under cladding layer 1/the over cladding layer 3 is specified by use of a ratio A (=R/T) of a curvature radius R (unit: μm) of the tip 10*a* such as the pen tip to a thickness T (unit: μm) of the core 2, the maximum value Δmax of the refractive index difference Δ is as in Formula (1) below. That is, when the refractive index difference Δ is larger than this maximum value Δmax, even when pressing is performed by the tip 10*a* such as the pen tip, the amount of leakage (scattering) of light is small and the light detection level in the light receiving element 5 does not sufficiently decrease, thereby making it difficult to distinguish between the position of the tip 10a such as the pen tip and the position of the hand 20.

(Mathematical Formula 1)

$$\Delta max = 8.0\times 10^{-2} - A\times(5.0\times 10^{-4}) \quad (1)$$

On the other hand, the minimum value Δmin of the refractive index difference Δ is as in Formula (2) below. That is, when the refractive index difference Δ is smaller than this minimum value Δmin, leakage (scattering) of light occurs even at the portion pressed by the hand 20, thereby making it difficult to distinguish between the position of the tip 10a such as the pen tip and the position of the hand 20.

(Mathematical Formula 2)

$$\Delta min = 1.1\times 10^{-2} - A\times(1.0\times 10^{-4}) \quad (2)$$

For this reason, the refractive index difference Δ is preferably set to between the minimum value Δmin and the maximum value Δmax. Here, for example when it is assumed that the curvature radius R (unit: μm) of the tip 10a is within a range of 100 to 1000, the thickness T (unit: μm) of the core 2 is within a range of 10 to 100 and the ratio A is within a range of 1 to 100, the refractive index difference Δ is within a range of $1.0\times 10^{-3}$ to $7.95\times 10^{-2}$. It is to be noted that in the case of the ratio A exceeding 100, the minimum value Δmin is set to $1.0\times 10^{-3}$ (fixed).

It should be noted that, although the rigid plate 7 has been provided for supporting the optical waveguide W in the above embodiment, the rigid plate 7 may not be provided. In that case, input is performed in a state where the optical waveguide W of the electronic underlay A is placed on a hard flat-surface stand such as a table, or in some other state.

Next, an example will be described in conjunction with a comparative example. However, the present invention is not restricted to the example.

Example

Formation Material for Over Cladding Layer

Component A: epoxy resin (EPOGOSEY PT., manufactured by Yokkaichi Chemical Company Ltd.) 30 parts by weight
Component B: epoxy resin (EHPE3150, manufactured by Daicel Corporation) 70 parts by weight
Component C: photoacid generator (CPI200K, manufactured by San-Apro Ltd.) 4 parts by weight
Component D: ethyl lactate (manufactured by Wako Pure Chemical Industries, Ltd.) 100 parts by weight
By mixing these components A to D, a formation material for the over cladding layer was prepared.
[Formation Material for Core]
Component E: epoxy resin (EHPE3150, manufactured by Daicel Corporation) 80 parts by weight
Component F: epoxy resin (YDCN700-10, manufactured by NIPPON STEEL & SUMIKIN CHEMICAL CO., LTD.) 20 parts by weight
Component G: photoacid generator (SP170, manufactured by ADEKA CORPORATION) 1 part by weight
Component H: ethyl lactate (Wako Pure Chemical Industries, Ltd.) 50 parts by weight
By mixing these components E to H, a formation material for the core was prepared.
[Formation Material for Under Cladding Layer]
Component I: epoxy resin (EPOGOSEY PT., manufactured by Yokkaichi Chemical Company Ltd.) 75 parts by weight
Component J: epoxy resin (JER1007, manufactured by Mitsubishi Chemical Corporation) 25 parts by weight
Component K: photoacid generator (CPI200K, manufactured by San-Apro Ltd.) 4 parts by weight
Component L: ethyl lactate (Wako Pure Chemical Industries, Ltd.) 50 parts by weight
By mixing these components I to L, a formation material for the under cladding layer was prepared.
[Production of Optical Waveguide]
Using the above formation material for the over cladding layer, an over cladding layer was formed on the surface of a glass substrate by spin coating. This over cladding layer had a thickness of 5 μm, an elasticity modulus of 1.2 GPa and a refractive index of 1.503.

Subsequently, using the above formation material for the core, a core was formed on the surface of the over cladding layer by a photolithography method. This core had a thickness of 30 μm, a width of its lattice-like portion of 100 μm, a pitch of 600 μm, an elasticity modulus of 3 GPa and a refractive index of 1.523.

Next, using the above formation material for the under cladding layer, an under cladding layer was formed on the surface of the over cladding layer by spin coating so as to cover the core. This under cladding layer had a thickness (thickness from the surface of the over cladding layer) of 200 μm, an elasticity modulus of 3 MPa and a refractive index of 1.503.

Then, there was prepared one obtained by adhering a double sided tape (thickness: 25 μm) to one surface of a PET substrate (thickness: 1 mm). Subsequently, the other adhesive surface of the double sided tape was made to adhere to the surface of the under cladding layer, and in that state, the over cladding layer was separated from the glass substrate.

Comparative Example

Formation Material for Over Cladding Layer

Component M: epoxy resin (Epogosey PT., manufactured by Yokkaichi Chemical Company Ltd.) 40 parts by weight
Component N: epoxy resin (2021P, manufactured by Daicel Corporation) 60 parts by weight
Component O: photoacid generator (SP170, manufactured by ADEKA CORPORATION) 4 parts by weight
By mixing these components M to O, a formation material for the over cladding layer was prepared.
[Formation Material for Core]
Component P: epoxy resin (Epogosey PT., manufactured by Yokkaichi Chemical Company Ltd.) 30 parts by weight
Component Q: epoxy resin (EXA-4816, manufactured by DIC Corporation) 70 parts by weight
Component R: photoacid generator (SP170, manufactured by ADEKA CORPORATION) 4 parts by weight
By mixing these components P to R, a formation material for the core was prepared.
[Formation Material for Under Cladding Layer]
Component S: epoxy resin (Epogosey PT., manufactured by Yokkaichi Chemical Company Ltd.) 40 parts by weight
Component T: epoxy resin (2021P, manufactured by Daicel Corporation) 60 parts by weight
Component U: photoacid generator (SP170, manufactured by ADEKA CORPORATION) 4 parts by weight
By mixing these components S to U, a formation material for the under cladding layer was prepared.
[Production of Optical Waveguide]
In the same manner as in the above example, an optical waveguide having the same size was prepared. However, an elasticity modulus of the over cladding layer was 1 GPa, that of the core was 25 MPa, and that of the under cladding layer was 1 GPa. Further, a refractive index of the over cladding layer was 1.504, that of the core was 1.532, and that of the under cladding layer was 1.504.

[Production of Electronic Underlay]

A light emitting element (XH85-S0603-2s, manufactured by Optowell Co., Ltd.) was connected to one end surface of the core in the optical waveguide of each of the above example and the comparative example. A light receiving element (s10226, manufactured by Hamamatsu Photonics K.K.) was connected to the other end surface of the core. A circuit, mounted with the light emitting element, the light receiving element, a CPU for controlling the electronic underlay, a memory and the like, was provided to produce the electronic underlay of each of the example and the comparative example.

[Confirmation of Operation of Electronic Underlay]

A sheet was put on the surface of the over cladding layer in the optical waveguide of the electronic underlay, and a data inputting person held a ballpoint pen (curvature radius of a pen tip: 350 μm) in his or her hand and wrote letters on the sheet.

Then, the electronic underlay was connected to a PC through a micro USB cable, and data stored into the memory of the electronic underlay was displayed on a display of the PC. As a result, as for the data formed by the electronic underlay of the example, only the letters written on the sheet were displayed. As opposed to this, as for the data formed by the electronic underlay of the comparative example, not only the letters written on the sheet but also a portion of the hand holding the ballpoint pen was displayed on the display.

From this result, it is found that only information written on the sheet can be detected and unnecessary information cannot be detected in the electronic underlay of the example.

Although the specific form in the present invention has been shown in the above example, the above example is mere exemplification, and should not be restrictively interpreted. A variety of modifications apparent to the skilled person in the art are intended to be within the scope of the present invention.

The electronic underlay of the present invention is usable for writing information such as notes on a sheet and simultaneously storing the information such as the notes as electronic data.

EXPLANATION OF REFERENCE

A electronic underlay
W optical waveguide 1 under cladding layer
2 core
3 over cladding layer
4 light emitting element
5 light receiving element

The invention claimed is:

1. An electronic underlay comprising:
a sheet-like optical waveguide in which a plurality of linear cores are arranged and formed in a lattice shape on the surface of a sheet-like under cladding layer, an over cladding layer is formed in a sheet shape covering the plurality of linear cores, and the surface of the over cladding layer is a contact surface for a sheet;
a light emitting element connected to first end surface of the plurality of linear cores;
a light receiving element connected to second end surface of the plurality of linear cores;
movement locus specifying means for specifying a movement locus of a tip of a writing tool on a surface of the sheet based on a light propagation amount of the plurality of linear cores which has been changed due to the movement; and
storage means for storing the specified movement locus as electronic data,
wherein an elasticity modulus of the plurality of linear cores is larger than an elasticity modulus of the under cladding layer and an elasticity modulus of the over cladding layer,
wherein, in a state where the surface of the sheet is pressed by the tip of the writing tool, in a direction of the pressing, a deformation ratio of the plurality of linear cores in a cross section is smaller than deformation ratios of the over cladding layer and the under cladding layer in cross sections, and
wherein the electronic underlay is capable of being laid under the sheet to perform writing with the writing tool.

2. The electronic underlay according to claim 1, wherein the elasticity modulus of the plurality of linear cores is within a range of 1 GPa to 10 GPa.

3. The electronic underlay according to claim 1, wherein the elasticity modulus of the over cladding layer is within a range of not lower than 0.1 MPa and lower than 10 GPa, and the elasticity modulus of the under cladding layer is within a range of 0.1 MPa to 1 GPa.

4. The electronic underlay according to claim 2, wherein the elasticity modulus of the over cladding layer is within a range of not lower than 0.1 MPa and lower than 10 GPa, and the elasticity modulus of the under cladding layer is within a range of 0.1 MPa to 1 GPa.

* * * * *